United States Patent [19]
Coules

[11] 3,836,704
[45] Sept. 17, 1974

[54] INSULATOR GROMMET OR SPACER

[75] Inventor: Ronald A. Coules, Chicago, Ill.

[73] Assignee: Richco Plastic Company, Chicago, Ill.

[22] Filed: Oct. 19, 1973

[21] Appl. No.: 408,074

[52] U.S. Cl. ................. 174/138 D, 24/73 P, 85/72, 85/76, 317/101 CC
[51] Int. Cl. ....... H05k 7/12, F16b 5/00, F16b 29/00
[58] Field of Search ........ 174/138 R, 138 D, 138 G, 174/153 R, 158 R; 317/101 CC, 101 CM, 101 CW, 101 D, 101 DH; 24/73 P, 73 PF, 73 PM, 73 HS, 73 MF, 73 D; 85/5 R, 72, 76, 80, 81, DIG. 2; 52/758 F; 248/27; 339/128

[56] References Cited
UNITED STATES PATENTS

| | | | |
|---|---|---|---|
| 2,657,894 | 11/1953 | Sklenar | 85/72 X |
| 2,936,015 | 5/1960 | Rapata | 85/80 |
| 2,941,439 | 6/1960 | Rapata | 85/72 |
| 2,984,698 | 5/1961 | Strauss | 174/138 R |
| 3,393,599 | 7/1968 | Fisher | 85/72 X |
| 3,513,509 | 5/1970 | Gross | 85/72 X |

FOREIGN PATENTS OR APPLICATIONS

| | | | |
|---|---|---|---|
| 994,424 | 6/1965 | Great Britain | 85/72 |
| 1,218,275 | 1/1971 | Great Britain | 85/72 |

*Primary Examiner*—Laramie E. Askin

[57] ABSTRACT

A chassis-panel assembly including an insulator grommet or spacer for securing the panel spaced apart over the chassis, and wherein said grommet includes a spacer body, a spreader block and securing wings. To assemble, the spreader block and wings are projected through an aperture in the chassis and a headed screw is extended through an aperture in the panel and engaged in the spreader block to draw the spreader block into the body and force the wings outwardly under the chassis until the screw head is seated tightly against the panel.

10 Claims, 5 Drawing Figures

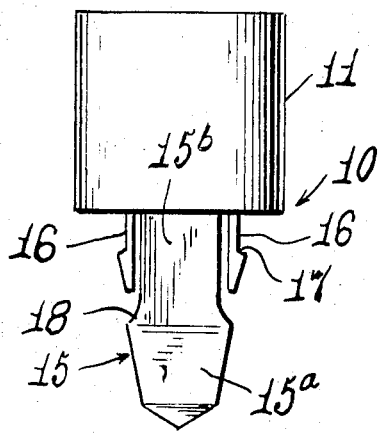
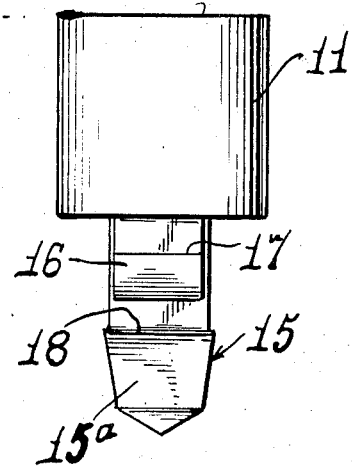
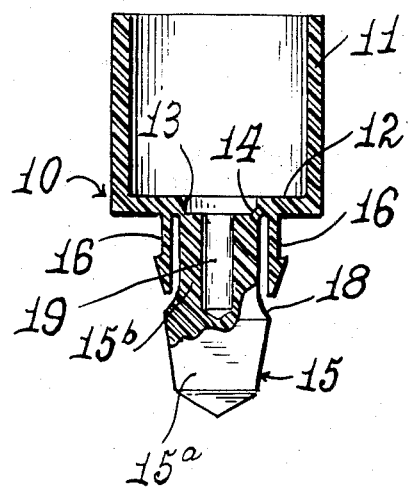
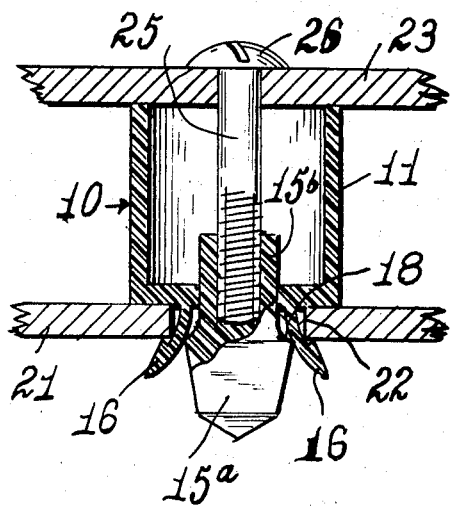
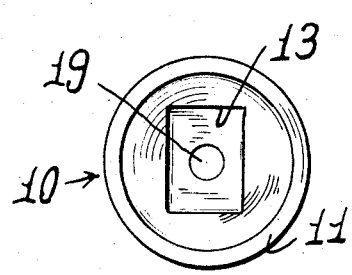

INSULATOR GROMMET OR SPACER

The invention relates to a chassis and panel assembly and to a grommet or spacer for firmly securing a panel spaced above a chassis. The invention is more particularly concerned with grommets of the character herein disclosed, which are molded in one piece from plastic insulating material and structured for automatic firm mounting of the panel on the chassis responsive to the turning of a screw of predetermined length extended through the panel and threaded into the grommet.

The structure by means of which such automatic action is obtained consists of a cylindrical body for housing the screw and a spreader block and wings molded integrally with the body bottom wall and adapted for insertion into an aperture in the chassis. When a panel is placed over the grommet, the screw is inserted freely through an aperture in the panel and is threaded into the spreader block. As the screw is turned, the spreader block is severed from the body and is drawn into the body to thereby cam the wings outwardly radially under the chassis. The panel is thus secured firmly to the body by the screw and the wings are spread firmly beneath and against the chassis, thus securing the assembly.

It is therefore an object of the invention to provide a novel insulator grommet of the character referred to for securing a panel spaced apart from and overlying a chassis.

Another object is to provide an insulator grommet for an apertured chassis with a novel spreader block and wings for fastening the grommet to the chassis.

Another object is to provide a novel one-piece insulator grommet fabricated from plastic dielectric material and having automatic means for securing a panel and chassis together, the said means being responsive to the turning of a screw threaded through the panel and into the grommet.

Another object is to provide a novel insulator grommet or spacer which is inexpensive to manufacture, easy to install and efficient in use.

Other objects and advantages of the invention will become apparent as the description proceeds, taken in conjunction with the accompanying drawings, in which FIG. 1 is an elevational view of the grommet or spacer.

FIG. 2 is a view similar to FIG. 1, viewing the grommet at 90° from the showing in FIG. 1.

FIG. 3 is a vertical sectional view showing the grommet before it is secured in place.

FIG. 4 is a top plan view of the grommet.

FIG. 5 is a vertical sectional view showing the grommet in place in a chassis-panel assembly.

Referring to the exemplary illustration of the insulator grommet or spacer shown in the accompanying drawings, the grommet 10 is comprised of a circular body 11 having a bottom wall 12 formed with an aperture 13 therein. Formed integral with the bottom wall 12, as by a thin web 14, and projecting outwardly therefrom is a spreader block 15 comprised of a head portion 15a and a stem portion 15b of reduced size. The stem portion 15b is of a size to permit it to be drawn into the body through the aperture 13 in a manner to be described presently. The aperture 13 and stem 15b are rectangular in plan, as best illustrated in FIG. 4, so that the spreader block is held against rotation relative to the body 11.

Projecting from the outside surface of the bottom wall 12 are a pair of wings 16. These wings, one located on each of two opposed sides of the spreader block 15 preferably are provided with barbs 17 on their free ends. The wings are spaced from the spreader block a distance required to locate their free ends within the confines of a shoulder 18 formed at the merger of the head portion 15a with the stem portion 15b. The spreader block 15 has an axial tapped hole 19 on the inside end thereof.

In use, the insulator grommet or spacer is placed on a chassis 21, with the wings 16 and spreader block 15 projecting through an opening 22 therein. A panel 23 is then seated over the top of body portion 11. This panel has an aperture therein to receive freely therethrough a headed screw 25 of predetermined length which is threaded into the tapped hole 19 in the spreader block. When the screw is tightened, it causes the thin web 14 to be ruptured and draws the stem 15b of the spreader block through aperture 13 and into the body 11. As illustrated in FIG. 5, when the spreader block is drawn into the body, the shoulders 18 engage the ends of wings 16 and causes said wings to spread apart radially until they engage firmly beneath the chassis for securing the grommet thereto. At the same time, the head 26 of screw 25 is brought down tightly against the top surface of panel 23, to secure it firmly against the top of the body 11. The assembly is very rigid and there is no lateral shifting of the panel and chassis relative to each other.

Although I have described a preferred embodiment of the invention, in considerable detail, it will be understood that the description thereof is intended to be illustrative rather than restrictive, as details of the structure may be modified or changed without departing from the spirit or scope of the invention. Accordingly, I do not desire to be restricted to the exact construction shown and described.

I claim:

1. An insulator grommet of plastic dielectric insulating material comprising a body including a bottom wall, a pair of wings extending outwardly from the bottom wall, a spreader block between said wings movable into a position to spread the wings, and screw receivable means connected to the spreader block to move it into wing spreading position.

2. The grommet recited in claim 1, wherein the spreader block is detachably secured to the bottom wall.

3. The grommet recited in claim 1, wherein the spreader block is detachably connected to the bottom wall by a fracturable web.

4. The grommet recited in claim 1, where the spreader block is non-circular.

5. The grommet recited in claim 1, wherein the bottom wall has a non-circular opening therein and the spreader block has a non-circular stem for extending into said opening when the spreader block is moved into wing spreading position.

6. A chassis-panel assembly comprising, in combination, a chassis having an aperture therein, a grommet mounted on said chassis, said grommet including a body, wings on the body extending through said aperture, a spreader block on said body between said wings, a panel seated on the body, said panel having an aperture therein, and a headed screw extended through said panel aperture and threaded into the spreader block to draw the block in a direction to spread the wings for locking the assembly together.

7. The assembly recited in claim 6, wherein the spreader block has a formed opening receiving the screw.

8. The assembly recited in claim 6, wherein the spreader block is severable from the body.

9. The assembly recited in claim 8, wherein the spreader block is shaped to be non-rotatable relative to the body when severed therefrom.

10. The assembly recited in claim 6, wherein the spreader block has shoulders engageable with the wings.

* * * * *